United States Patent
Marzban et al.

(10) Patent No.: US 12,003,979 B2
(45) Date of Patent: Jun. 4, 2024

(54) METHODS AND APPARATUS FOR BASE STATION SIGNALING FOR INTERFERENCE ESTIMATION

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US); Taesang Yoo, San Diego, CA (US); Arumugam Chendamarai Kannan, San Diego, CA (US); Hamed Pezeshki, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 17/516,321

(22) Filed: Nov. 1, 2021

(65) Prior Publication Data
US 2023/0136038 A1    May 4, 2023

(51) Int. Cl.
    H04W 24/02      (2009.01)
    H04W 72/08      (2009.01)
    H04W 72/542     (2023.01)

(52) U.S. Cl.
    CPC ......... H04W 24/02 (2013.01); H04W 72/542 (2023.01)

(58) Field of Classification Search
    CPC .............................. H04W 24/02; H04W 72/542
    USPC ........................................................ 370/252
    See application file for complete search history.

(56) References Cited

U.S. PATENT DOCUMENTS

2018/0279108 A1* 9/2018 So ................. H04L 5/0044
2022/0029688 A1* 1/2022 Pezeshki ............. H04B 7/0695

FOREIGN PATENT DOCUMENTS

EP         2107850 B1 *    4/2015      ........... H04L 5/0053

OTHER PUBLICATIONS

CMCC: "Status Report for SI on Remote Interference Management for NR", 3GPP TSG RAN meeting #82, RP-182510, 3rd Generation Partnership Project, Mobile Competence Centre, 650, Route Des Lucioles, F-06921 Sophia-Antipolis Cedex, France, vol. TSG RAN, No. Sorrento, Italy, Dec. 10, 2018-Dec. 13, 2018, Dec. 9, 2018, 15 Pages, XP051553091, p. 8, lines 1-13.

(Continued)

*Primary Examiner* — Gbemileke J Onamuti
(74) *Attorney, Agent, or Firm* — ArentFox Schiff LLP

(57) ABSTRACT

Aspects of the present disclosure include methods, apparatuses, and computer readable media for receiving interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS), estimating or predicting, based on the interference information received, an interference power profile caused by the at least one neighbor BS, receiving at least one of data information or control information, and decoding the at least one of the data information or the control information based on the interference power profile.

24 Claims, 7 Drawing Sheets

(56) References Cited

OTHER PUBLICATIONS

CMCC: "Updated Summary for NR-RIM", 3GPP TSG RAN WG 1 Meeting #94bis, R1-1812060, 3rd Generation Partnership Project, Mobile Competence Centre, 650, Route Des Lucioles, F-06921 Sophia-Antipolis, CE, vol. RAN WG1, No. Chengdu, China, Oct. 8, 2018-Oct. 12, 2018, Oct. 12, 2018, 37 Pages, XP051519385, p. 23, Last Figure from the Top, Proposal 5.

Deutsche Telekom AG., et al., "Coordinated Link Adaptation Based on Multi-cell Channel Estimation in the LTE-A Uplink", 3GPP TSG RAN WG1 Meeting #59, R1-095067, 3rd Generation Partnership Project, Mobile Competence Centre, 650, Route Des Lucioles, F-06921 Sophia-Antipolis Cedex, France, No. Jeju, Nov. 9, 2009, Nov. 9, 2009, 6 Pages, XP050389406, Figure 1, p. 2.

International Search Report and Written Opinion—PCT/US2022/076081—ISA/EPO—Jan. 5, 2023.

Kyocera Corp: "Carrier-based HetNet ICIC", 3GPP TSG-RAN WG3 #74, R3-112965, 3rd Generation Partnership Project, Mobile Competence Centre, 650, Route Des Lucioles, F-06921 Sophia-Antipolis Cedex, France, vol. RAN WG3, No. San Francisco, CA, USA, Nov. 14, 2011-Nov. 18, 2011, Nov. 5, 2011, 5 Pages, XP050566247, 2.5 Alternative proposals, Figure 3.

Lopez-Perez D., et al., "A Survey on 5G Energy Efficiency: Massive MIMO, Lean Carrier Design, Sleep Modes, and Machine Learning", Arxiv.org, Cornell University Library, 201 Olin Library Cornell University Ithaca, NY 14853, Jan. 27, 2021, 96 Page, XP081868422, p. 58, line 18-19, p. 71, B. ML for 5G Energy Efficiency Optimisation.

\* cited by examiner

600

605

TRANSMIT, TO A USER EQUIPMENT (UE), INFORMATION RELATING TO AT LEAST ONE OF A SCHEDULING GRANULARITY, A SUBCARRIER SPACING, A SCHEDULER TYPE, RESOURCE UTILIZATION, A NUMBER OF ACTIVE UES, A NUMBER OF ACTIVE BEAMS, AN ELEVATION AND AN AZIMUTH ANGLE OF EACH OF THE NUMBER OF ACTIVE BEAMS, A SYNCHRONIZATION SIGNAL BLOCK INDEX OR A SEMI-PERSISTENT SCHEDULING CONFIGURATION ASSOCIATED WITH AT LEAST ONE NEIGHBOR BS, WHEREIN THE UE IS CONFIGURED TO ESTIMATE OR PREDICT, BASED ON THE INFORMATION, AN INTERFERENCE POWER PROFILE CAUSED BY THE AT LEAST ONE NEIGHBOR BS

610

TRANSMIT, TO THE UE, AT LEAST ONE OF DATA INFORMATION OR CONTROL INFORMATION, WHEREIN THE UE IS CONFIGURED TO DECODE THE AT LEAST ONE OF THE DATA INFORMATION OR THE CONTROL INFORMATION BASED ON THE INTERFERENCE POWER PROFILE

TRANSMIT, TO A USER EQUIPMENT (UE) IN A NEIGHBORING CELL OF THE BS, INFORMATION RELATING TO AT LEAST ONE OF A SCHEDULING GRANULARITY, A SUBCARRIER SPACING, A SCHEDULER TYPE, RESOURCE UTILIZATION, A NUMBER OF ACTIVE UES, A NUMBER OF ACTIVE BEAMS, AN ELEVATION AND AN AZIMUTH ANGLE OF EACH OF THE NUMBER OF ACTIVE BEAMS, A SYNCHRONIZATION SIGNAL BLOCK INDEX OR A SEMI-PERSISTENT SCHEDULING CONFIGURATION ASSOCIATED WITH THE BS, WHEREIN THE UE IS CONFIGURED TO ESTIMATE ESTIMATING OR PREDICTING, BASED ON THE INFORMATION, AN INTERFERENCE POWER PROFILE CAUSED BY THE BS

*FIG. 7*

METHODS AND APPARATUS FOR BASE STATION SIGNALING FOR INTERFERENCE ESTIMATION

TECHNICAL FIELD

Aspects of the present disclosure relate generally to wireless communications, and more particularly, to apparatuses and methods for base station signaling for interference estimation.

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a base station (BS) may transmit downlink (DL) information to a user equipment (UE) in a cell of the BS. Neighboring BSs may also transmit information to other UEs. However, transmission from the neighboring BSs may cause interference to the UE in the cell of the BS when the UE is receiving the DL information from the BS. The interference may lead to loss of information, delay, and/or other deleterious effects. Therefore, improvements in reducing the impacts of the interference may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a user equipment (UE) for receiving interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS), estimating or predicting, based on the interference information received, an interference power profile caused by the at least one neighbor BS, receiving at least one of data information or control information, and decoding the at least one of the data information or the control information based on the interference power profile.

Other aspects of the present disclosure include a user equipment (UE) having a memory comprising instructions, a transceiver, and one or more processors operatively coupled with the memory and the transceiver, the one or more processors configured to execute instructions in the memory to receive interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS), estimate or predict, based on the interference information received, an interference power profile caused by the at least one neighbor BS, receive at least one of data information or control information, and decode the at least one of the data information or the control information based on the interference power profile.

An aspect of the present disclosure includes a user equipment (UE) including means for receiving interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS), means for estimating or predicting, based on the interference information received, an interference power profile caused by the at least one neighbor BS, means for receiving at least one of data information or control information, and means for decoding the at least one of the data information or the control information based on the interference power profile.

Some aspects of the present disclosure include non-transitory computer readable media having instructions stored therein that, when executed by one or more processors of a user equipment (UE), cause the one or more processors to receive interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS), estimate or predict, based on the interference information received, an interference power profile caused by the at least one neighbor BS, receive at least one of data information or control information, and decode the at least one of the data information or the control information based on the interference power profile.

Aspects of the present disclosure includes a method by a base station including transmitting, to a user equipment (UE), interference information relating to at least one of a scheduling granularity, a subcarrier spacing, a scheduler type, resource utilization, a number of active UEs, a number of active beams, an elevation and an azimuth angle of each of the number of active beams, a synchronization signal block index or a semi-persistent scheduling configuration associated with at least one neighbor BS, wherein the UE is configured to estimate or predict, based on the interference information, an interference power profile caused by the at least one neighbor BS and transmitting, to the UE, at least one of data information or control information, wherein the UE is configured to decode the at least one of the data information or the control information based on the interference power profile.

Other aspects of the present disclosure include a base station having a memory comprising instructions, a transceiver, and one or more processors operatively coupled with the memory and the transceiver, the one or more processors configured to execute instructions in the memory to transmit, to a user equipment (UE), interference information relating to at least one of a scheduling granularity, a subcarrier spacing, a scheduler type, resource utilization, a number of active UEs, a number of active beams, an elevation and an azimuth angle of each of the number of active beams, a synchronization signal block index or a semi-persistent scheduling configuration associated with at least one neighbor BS, wherein the UE is configured to estimate or predict, based on the interference information, an interference power profile caused by the at least one neighbor BS and transmit, to the UE, at least one of data information or control information, wherein the UE is configured to decode the at least one of the data information or the control information based on the interference power profile Aspects of the present disclosure includes a user equipment having means for transmitting, to a user equipment (UE), interference information relating to at least one of a scheduling granularity, a subcarrier spacing, a scheduler type, resource utilization, a number of active UEs, a number of active beams, an elevation and an azimuth angle of each of the number of active beams, a synchronization signal block index or a semi-persistent scheduling configuration associated with at least one neighbor BS, wherein the UE is configured to estimate or predict, based on the interference information, an interference power profile caused by the at least one neighbor BS and means for transmitting, to the UE, at least one of data information or control information, wherein the UE is configured to decode the at least one of the data information or the control information based on the interference power profile Some aspects of the present disclosure include non-transitory computer readable media having instructions stored therein that, when executed by one or more processors of a base station, cause the one or more processors to transmit, to a user equipment (UE), interference information relating to at least one of a scheduling granularity, a subcarrier spacing, a scheduler type, resource utilization, a number of active UEs, a number of active beams, an elevation and an azimuth angle of each of the number of active beams, a synchronization signal block index or a semi-persistent scheduling configuration associated with at least one neighbor BS, wherein the UE is configured to estimate or predict, based on the interference information, an interference power profile caused by the at least one neighbor BS and transmit, to the UE, at least one of data information or control information, wherein the UE is configured to decode the at least one of the data information or the control information based on the interference power profile Aspects of the present disclosure includes a method by a base station including transmitting, to a user equipment (UE) in a neighboring cell of the BS, interference information relating to at least one of a scheduling granularity, a subcarrier spacing, a scheduler type, resource utilization, a number of active UEs, a number of active beams, an elevation and an azimuth angle of each of the number of active beams, a synchronization signal block index or a semi-persistent scheduling configuration associated with the BS, wherein the UE is configured to estimate estimating or predicting, based on the interference information, an interference power profile caused by the BS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 6 illustrates an example of a method for transmitting interference information to a UE in the serving cell; and FIG. 7 illustrates an example of a method for transmitting interference information to a UE in a neighboring cell.

DETAILED DESCRIPTION

Figure 1:
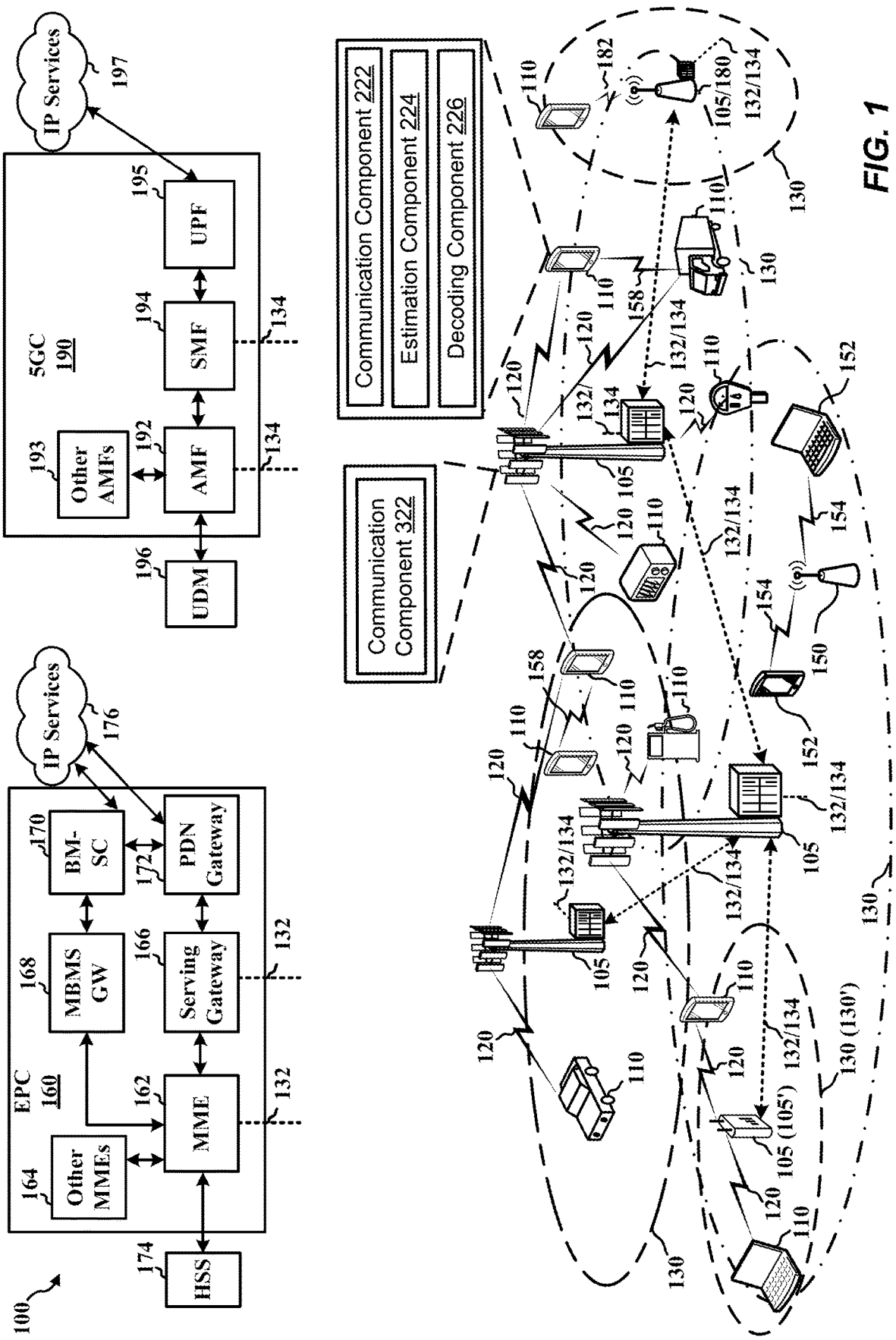
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some aspects, slot structures may be flexible in a communication network. Examples of flexible slot structures include mini-slots and ultra-reliable-low latency communications (URLLC). Short bursts of transmission within a regular enhanced mobile broadband (eMBB) slot may start at arbitrary symbol locations. Unscheduled uplink transmissions without a grant may be allowed. The network may implement highly adaptive reference signal patterns (e.g., demodulation reference signal (DMRS) and/or channel state information (CSI) reference signal (CSI-RS) patterns may depend on the number of antenna ports, delay tolerance, doppler spread, etc.). Further, the network may implement beam-based transmissions (e.g., interference fluctuates with beam changes, including beam refinements, dynamic switching among multiple possible broadband over power lines (BPLs), etc.). As a result, a user equipment (UE) in the network may experience dynamic bursty inter-cell interference. The interference may vary in the symbol time scale. However, conventional interference measurement framework may be insufficient because the framework only provides measurements on a relatively large time scale (e.g., larger than a symbol).

In one aspect of the present disclosure, a UE may receive information relating to interference caused by one or more neighboring base stations (BSs). Such information may be transmitted to the UE by the serving BS, or the one or more neighboring BSs. The UE may receive information from the serving BS, and decode the information based on an interference power profile derived from the information relating to the interference.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. The UE 110 may include an estimation component 224 configured to estimate or predict an interference power profile caused by the transmission of a neighboring BS. The UE 110 may include a decoding component 226 configured to decode data and/or control information based on the interference power profile. In some implementations, the communication component 222, the estimation component 224, and/or the decoding component 226 may be implemented using hardware, software, or a combination of hardware and software. In some implementations, the BS 105 may include a communication component 322 configured to communicate with the UE 110. In some implementations, the communication component 322 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electro-magnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
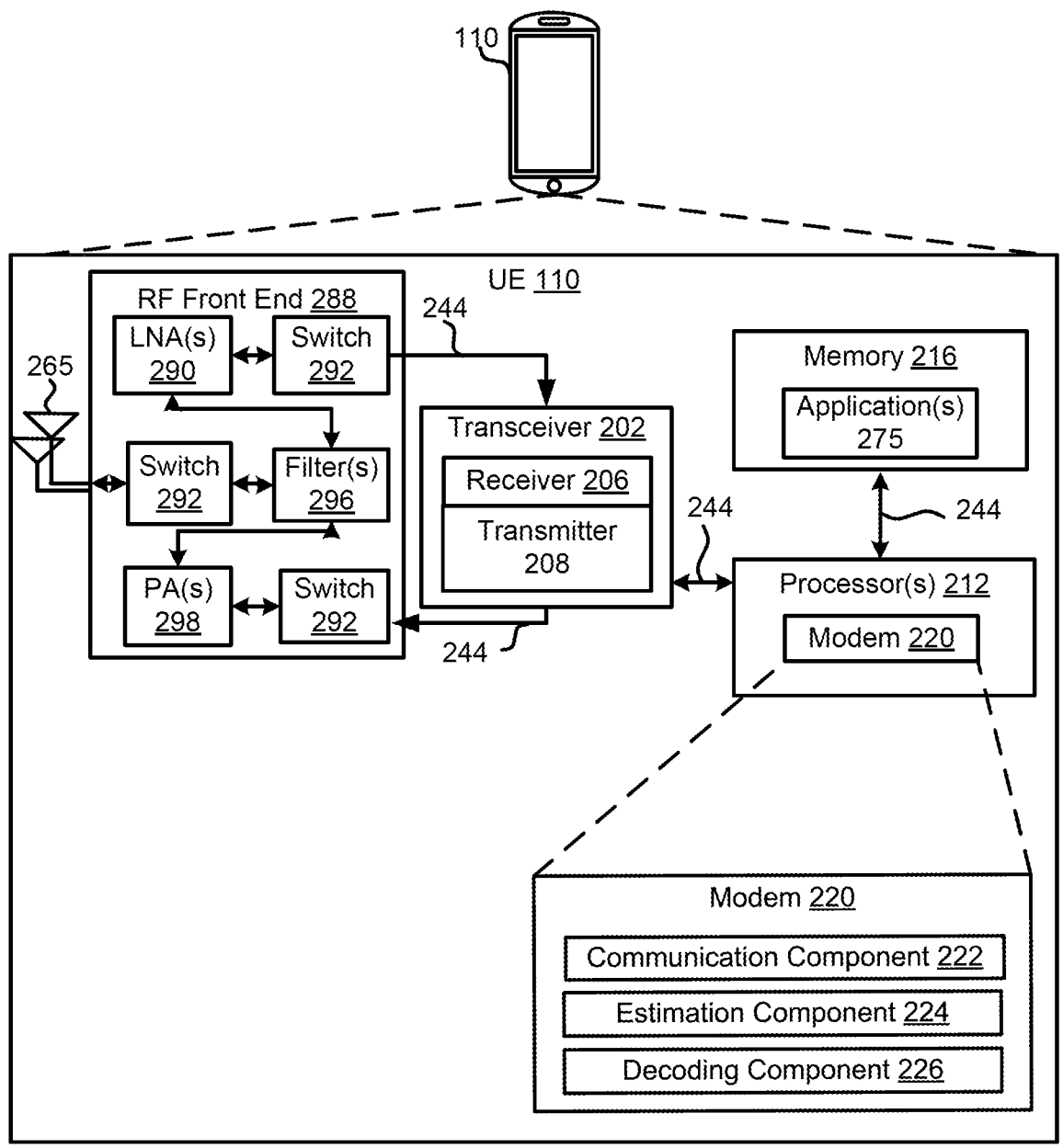
FIG. 2 is a schematic diagram of an example of a user equipment.

Referring to FIG. 2, one example of an implementation of the UE 110 may include a modem 220 having the communication component 222, the estimation component 224, and/or the decoding component 226. In one implementation, the UE 110 may include a communication component 222 configured to communicate with the BS 105 via a cellular network, a Wi-Fi network, or other wireless and wired networks. The UE 110 may include an estimation component 224 configured to estimate or predict an interference power profile cause by the transmission of a neighboring BS. The UE 110 may include a decoding component 226 configured to decode data and/or control information based on the interference power profile.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222, the estimation component 224, and/or the decoding component 226 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, the estimation component 224, and/or the decoding component 226, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, the estimation component 224, and/or the decoding component 226, and/or one or more of the subcomponents, and/or data associated therewith, when UE 110 is operating at least one processor 212 to execute the communication component 222, the estimation component 224, and/or the decoding component 226, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
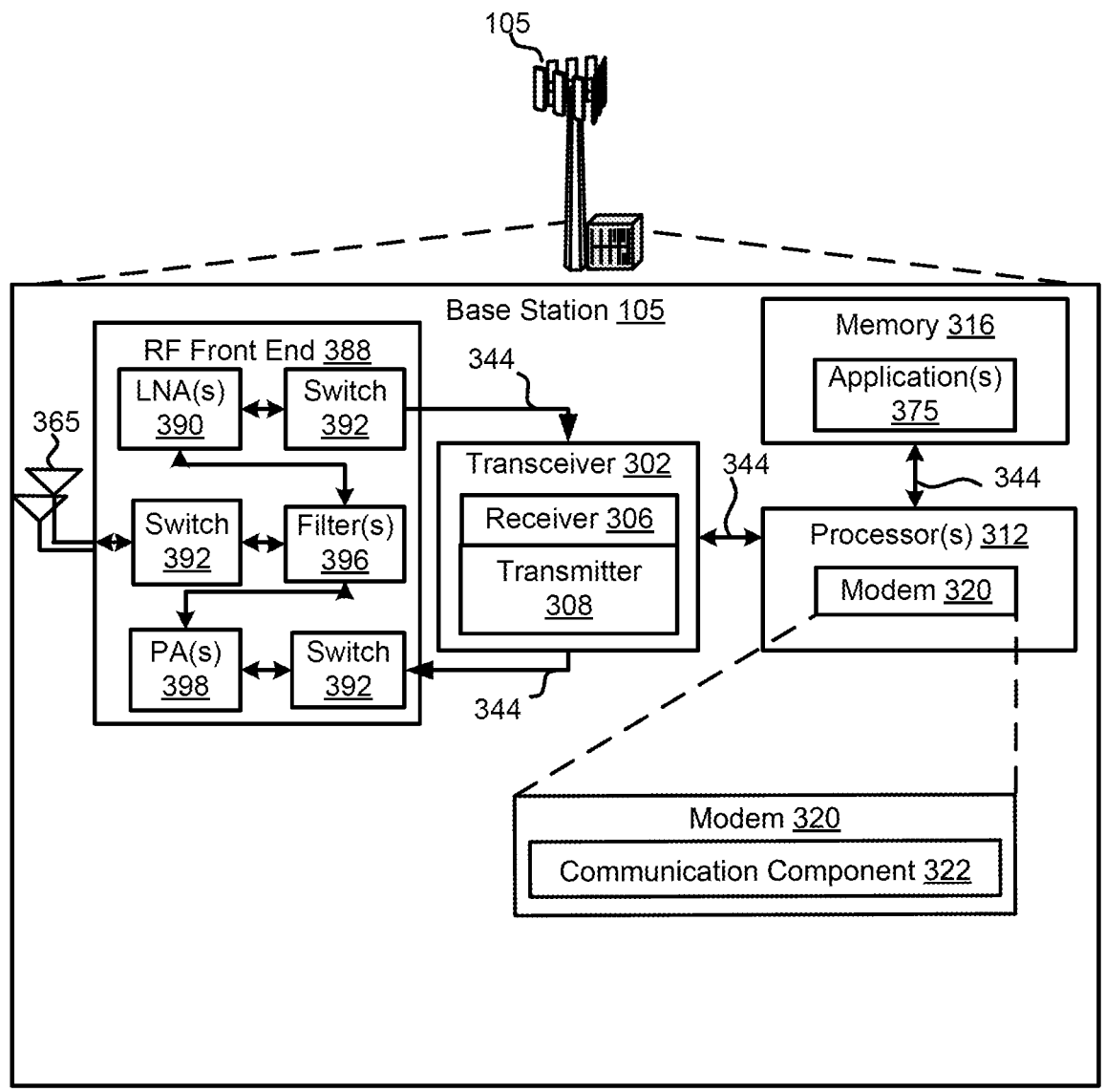
FIG. 3 is a schematic diagram of an example of a base station.

Referring to FIG. 3, one example of an implementation of the BS 105 may include a modem 320 having the communication component 322. In some implementations, the BS 105 may include a communication component 322 configured to communicate with the UE 110.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, and/or one or more of the subcomponents, and/or data associated therewith, when the BS 105 is operating at least one processor 312 to execute the communication component 322, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
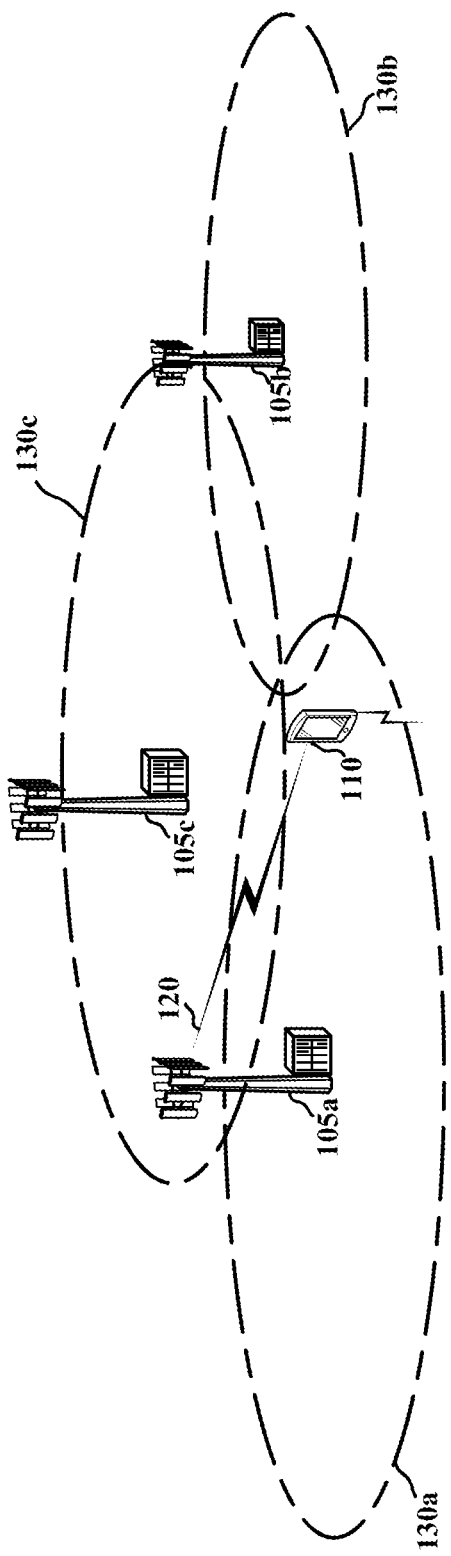
FIG. 4 illustrates an example of an environment for estimating or predicting inter-cell interference according to aspects of the present disclosure.

FIG. 4 illustrates an example of an environment for estimating or predicting inter-cell interference. In some aspects, the first BS 105a may be the serving cell of the UE 110. The UE 110 may be within the first coverage area 130a of the first BS 105a. Although the UE 110 may not be serviced by the second BS 105b and the third BS 105c, the UE 110 may be near (e.g., within 10 meters, 50 meters, 100 meters, etc.) the second coverage area 130b of the second BS 105b and/or the third coverage area 130c of the third BS 105c. The UE 110 may receive DL information from the first BS 105a (i.e., the serving BS) while receiving interference from the second BS 105b and/or the third BS 105c. For example, the UE 110 may receive DL information from the first BS 105a while the second BS 105b is transmitting two DL mini-slots and the third BS 105c is transmitting DL information and receiving UL information. The UE 110 may experience interferences from both the second BS 105b and the third BS 105c.

In some aspects of the present disclosure, the first BS 105a (i.e., the serving BS) may communicate with the second BS 105b and/or the third BS 105c (e.g., inter-BS coordination via backhaul) to obtain information associated with the interferences the second BS 105b and/or the third BS 105c may cause to the UE 110. For example, the second BS 105b and/or the third BS 105c may transmit information relating to scheduling granularity (e.g., mini-slot-level (with different sizes), slot-level, 2 slots, etc.), subcarrier spacing, and/or type of scheduler (e.g., proportional fair, round robin, etc.) to the first BS 105a. Such information may affect the temporal correlation of the interference. For example, when the neighboring BSs (such as the second BS 105b and/or the third BS 105c) utilizes mini-slots with 4 symbols, the interference variations may increase as compared to utilizing the mini-slots with 1 symbol. In another example, when the neighboring BSs utilize higher subcarrier spacings, the interference variations may increase due to smaller symbol durations.

In some aspects of the present disclosure, the first BS 105a may transmit the above information to the UE 110. If the UE 110 has information relating to the scheduling granularity (e.g., mini-slot size), subcarrier spacing, and/or type of scheduler of the neighboring BSs, the UE 110 may generate interference correlation over time using machine learning. As a result, the UE 110 may demodulate and/or decode received information based on the interference correlation.

In certain aspects of the present disclosure, the second BS 105b and/or the third BS 105c may transmit information relating to loading/resource utilization, the number of active UEs in each cell, the number of active beams by each BS, the number of transmission configuration indicator (TCI) states, the elevation angles of the active beams, the azimuth angles of the active beams, and/or the synchronization signal block (SSB) indices to the first BS 105a. The first BS 105a may transmit the information to the UE 110. The UE 110 may determine spatial diversity and/or rank of the interference based on the information.

In another aspect of the present disclosure, the second BS 105b and/or the third BS 105c may transmit information relating to semi-persistent scheduling (SPS) configuration or configured grant (CG) configuration to the first BS 105a. SPS and/or CG configurations may cause periodic interferences to the UE 110. The first BS 105a may transmit the information to the UE 110. The UE 110 may estimate the interference based on the SPS and/or CG configurations.

In some aspects of the present disclosure, the first BS 105a may transmit one or more of the scheduling granularity, subcarrier spacing, type of scheduler, loading/resource utilization, the number of active UEs in each cell, the number of active beams by each BS, the number of TCI states, the elevation angles of the active beams, the azimuth angles of the active beams, and/or the SSB indices (referred to as the interference information) to the UE 110. The first BS 105a may transmit the interference information to UEs near the edge of the first coverage area 130a and not to UEs away from the edge of the first coverage area 130a. In an aspect, the first BS 105a may transmit the interference information to UEs within a threshold distance (e.g., 10 meters, 50 meters, 100 meters, etc.) from the edge of the first coverage area 130a.

In certain aspects of the present disclosure, the first BS 105a may broadcast the interference information to the UEs within the cell served by the first BS 105a.

In other aspects of the present disclosure, the first BS 105a may receive UE capability reports from the UEs within the cell served by the first BS 105a. The UE capability reports may indicate whether the UE has machine learning receiver capability. Based on the capability reports, the first BS 105a may transmit the interference information to the UEs having the machine learning receiver capability. The first BS 105a may transmit the interference information via a radio resource control (RRC) signal, a medium access control (MAC) control element (CE), and/or downlink control information (DCI).

In some aspects of the present disclosure, the UE 110 may transmit a request for the interference information to the first BS 105a. The request may be frequency range specific, carrier specific, and/or bandwidth part (BWP) specific. In response, the first BS 105a may transmit the interference information to the UE 110. The first BS 105a may transmit the interference information to the UE 110 via a RRC signal, a MAC CE, and/or DCI.

In some aspects of the present disclosure, one or more of the neighboring BSs (i.e., the second BS 105b and/or the third BS 105c) may transmit the interference information to the UE 110.

In certain aspects of the present disclosure, the UE 110 may estimate or predict an interference power profile (for example, using the machine learning approach) based on the interference information associated with the interference caused by the second BS 105*b* and/or the third BS 105*c*. The interference power profile may include the interference power values across various frequency subbands and/or different times (slots and/or symbols). The first BS 105*a* may transmit DL information (data and/or control) to the UE 110. The UE 110 may decode and/or demodulate the DL information based on the interference power profile.

Figure 5:
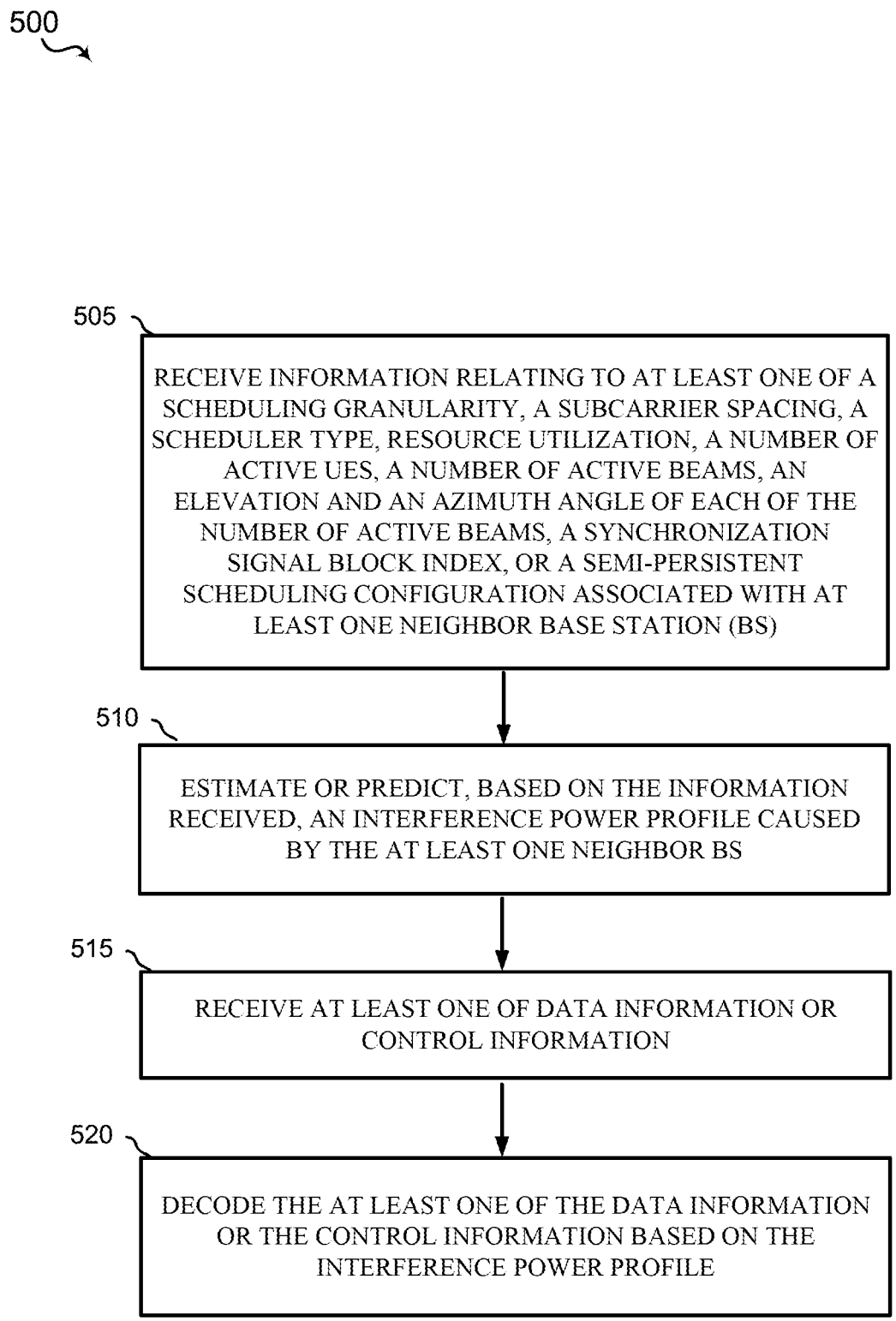
FIG. 5 illustrates an example of a method for estimating or predicting an interference power profile according to aspects of the present disclosure.

FIG. 5 illustrates an example of a method for estimating or predicting an interference power profile. For example, a method 500 may be performed by the one or more of the processor 212, the memory 216, the applications 275, the modem 220, the transceiver 202, the receiver 206, the transmitter 208, the RF front end 288, the communication component 222, the estimation component 224, and/or the decoding component 226, and/or one or more other components of the UE 110 in the wireless communication network 100.

At block 505, the method 500 may receive interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS). For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS) as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS).

At block 510, the method 500 may estimate or predict, based on the information received, an interference power profile caused by the at least one neighbor BS. For example, the estimation component 224, the processor 212, the memory 216, the modem 220, and/or the applications 275 of the UE 110 may estimate or predict, based on the information received, an interference power profile caused by the at least one neighbor BS as described above.

In certain implementations, the estimation component 224, the processor 212, the memory 216, the modem 220, and/or the applications 275 may be configured to and/or may define means for estimating or predicting, based on the information received, an interference power profile caused by the at least one neighbor BS.

At block 515, the method 500 may receive at least one of data information or control information. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive at least one of data information or control information. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving at least one of data information or control information.

At block 520, the method 500 may decode the at least one of the data information or the control information based on the interference power profile. For example, the decoding component 226, the processor 212, the memory 216, the modem 220, and/or the applications 275 of the UE 110 may decode the at least one of the data information or the control information based on the interference power profile as described above.

In certain implementations, the decoding component 226, the processor 212, the memory 216, the modem 220, and/or the applications 275 may be configured to and/or may define means for the at least one of the data information or the control information based on the interference power profile.

Alternatively or additionally, the method 500 may further include any of the methods above, wherein receiving the information comprises receiving the information from a serving BS or the at least one neighbor BS.

Alternatively or additionally, the method 500 may further include any of the methods above, further comprising, prior to receiving the information transmitting a capability report indicating an ability of the UE to estimate or predict the interference power profile, and wherein receiving the information comprises receiving the information in response to transmitting the capability report.

Alternatively or additionally, the method 500 may further include any of the methods above, wherein receiving the information comprises receiving the information via a radio resource control (RRC) signal, a medium access control (MAC) control element (CE), or downlink control information.

Alternatively or additionally, the method 500 may further include any of the methods above, further comprising transmitting, prior to receiving the information, a request for the information, and wherein receiving the information comprises receiving the information in response to transmitting the request.

Alternatively or additionally, the method 500 may further include any of the methods above, wherein estimating or predicting the interference power profile comprises estimating or predicting using a machine learning scheme.

FIG. 6 illustrates an example of a method for transmitting interference information to a UE in the serving cell. For example, a method 600 may be performed by the one or more of the processor 312, the memory 316, the applications 375, the modem 320, the transceiver 302, the receiver 306, the transmitter 308, the RF front end 388, the communication component 322, and/or one or more other components of the BS 105 in the wireless communication network 100.

At block 605, the method 600 may transmit, to a user equipment (UE), interference information relating to at least one of a scheduling granularity, a subcarrier spacing, a scheduler type, resource utilization, a number of active UEs, a number of active beams, an elevation and an azimuth angle of each of the number of active beams, a synchronization signal block index or a semi-persistent scheduling configuration associated with at least one neighbor BS, wherein the UE is configured to estimate or predict, based on the information, an interference power profile caused by the at least one neighbor BS. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit, to a user equipment (UE), interference information relating to at least one of a scheduling granularity, a subcarrier spacing, a scheduler type, resource utilization, a number of active UEs, a number of active beams, an elevation and an azimuth angle of each of the number of active beams, a synchronization signal block index or a semi-persistent scheduling configuration associated with at least one neighbor BS, wherein the UE is configured to estimate or predict, based on the information, an interference power profile caused by the at least one neighbor BS as described above. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting, to a user equipment (UE), interference information relating to at least one of a scheduling granularity, a subcarrier spacing, a scheduler type, resource utilization, a number of active UEs, a number of active beams, an elevation and an azimuth angle of each of the number of active beams, a synchronization signal block index or a semi-persistent scheduling configuration associated with at least one neighbor BS, wherein the UE is configured to estimate or predict, based on the information, an interference power profile caused by the at least one neighbor BS.

At block 610, the method 600 may transmit, to the UE, at least one of data information or control information, wherein the UE is configured to decode the at least one of the data information or the control information based on the interference power profile. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit, to the UE, at least one of data information or control information, wherein the UE is configured to decode the at least one of the data information or the control information based on the interference power profile as described above. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting, to the UE, at least one of data information or control information, wherein the UE is configured to decode the at least one of the data information or the control information based on the interference power profile.

Alternatively or additionally, the method 600 may further include any of the methods above, further comprising, prior to transmitting the information receiving at least a portion of the information from the at least one neighbor BS.

Alternatively or additionally, the method 600 may further include any of the methods above, further comprising receiving location information of the UE, and identifying a location of the UE based on the location information, wherein the UE is located within a threshold distance from an edge of a cell served by the BS, wherein transmitting the information comprises transmitting the information in response to the UE being located within the threshold distance from the edge of the cell.

Alternatively or additionally, the method 600 may further include any of the methods above, wherein transmitting the information comprises broadcasting the information to a plurality of UEs.

Alternatively or additionally, the method 600 may further include any of the methods above, further comprising receiving a capability report indicating an ability of the UE to estimate or predict the interference power profile, wherein transmitting the information comprises transmitting the information in response to receiving the capability report.

Alternatively or additionally, the method 600 may further include any of the methods above, further comprising receiving a request for the information wherein transmitting the information comprises transmitting the information in response to receiving the request.

FIG. 7 illustrates an example of a method for transmitting interference information to a UE in a neighboring cell. For example, a method 700 may be performed by the one or more of the processor 312, the memory 316, the applications 375, the modem 320, the transceiver 302, the receiver 306, the transmitter 308, the RF front end 388, the communication component 322, and/or one or more other components of the BS 105 in the wireless communication network 100.

At block 705, the method 700 may transmit, to a user equipment (UE) in a neighboring cell of the BS, interference information relating to at least one of a scheduling granularity, a subcarrier spacing, a scheduler type, resource utilization, a number of active UEs, a number of active beams, an elevation and an azimuth angle of each of the number of active beams, a synchronization signal block index or a semi-persistent scheduling configuration associated with the BS, wherein the UE is configured to estimate estimating or predicting, based on the interference information, an interference power profile caused by the BS. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit, to a user equipment (UE) in a neighboring cell of the BS, interference information relating to at least one of a scheduling granularity, a subcarrier spacing, a scheduler type, resource utilization, a number of active UEs, a number of active beams, an elevation and an azimuth angle of each of the number of active beams, a synchronization signal block index or a semi-persistent scheduling configuration associated with the BS, wherein the UE is configured to estimate estimating or predicting, based on the interference information, an interference power profile caused by the BS as described above. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting, to a user equipment (UE) in a neighboring cell of the BS, interference information relating to at least one of a scheduling granularity, a subcarrier spacing, a scheduler type, resource utilization, a number of active UEs, a number of active beams, an elevation and an azimuth angle of each of the number of active beams, a synchronization signal block index or a semi-persistent scheduling configuration associated with the BS, wherein the UE is configured to estimate estimating or predicting, based on the interference information, an interference power profile caused by the BS.

Additional Implementations

Aspects of the present disclosure include methods by a user equipment (UE) for receiving interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS), estimating or predicting, based on the interference information received, an interference power profile caused by the at least one neighbor BS, receiving at least one of data information or control information, and decoding the at least one of the data information or the control information based on the interference power profile.

Any of the methods above, wherein receiving the information comprises receiving the information from a serving BS or the at least one neighbor BS.

Any of the methods above, further comprising, prior to receiving the information transmitting a capability report indicating an ability of the UE to estimate or predict the interference power profile, and wherein receiving the information comprises receiving the information in response to transmitting the capability report.

Any of the methods above, wherein receiving the information comprises receiving the information via a radio resource control (RRC) signal, a medium access control (MAC) control element (CE), or downlink control information.

Any of the methods above, further comprising transmitting, prior to receiving the information, a request for the information, and wherein receiving the information comprises receiving the information in response to transmitting the request.

Any of the methods above, wherein estimating or predicting the interference power profile comprises estimating or predicting using a machine learning scheme.

Other aspects of the present disclosure include a user equipment (UE) having a memory comprising instructions, a transceiver, and one or more processors operatively coupled with the memory and the transceiver, the one or more processors configured to execute instructions in the memory to receive interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS), estimate or predict, based on the interference information received, an interference power profile caused by the at least one neighbor BS, receive at least one of data information or control information, and decode the at least one of the data information or the control information based on the interference power profile.

Any of the UEs above, wherein receiving the information comprises receiving the information from a serving BS or the at least one neighbor BS.

Any of the UEs above, wherein the one or more processors are further configured to transmit a capability report indicating an ability of the UE to estimate or predict the interference power profile, and wherein receiving the information comprises receiving the information in response to transmitting the capability report.

Any of the UEs above, wherein receiving the information comprises receiving the information via a radio resource control (RRC) signal, a medium access control (MAC) control element (CE), or downlink control information.

Any of the UEs above, wherein the one or more processors are further configured to transmit, prior to receiving the information, a request for the information, and wherein receiving the information comprises receiving the information in response to transmitting the request.

Any of the UEs above, wherein estimating or predicting the interference power profile comprises estimating or predicting using a machine learning scheme.

An aspect of the present disclosure includes a user equipment (UE) including means for receiving interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS), means for estimating or predicting, based on the interference information received, an interference power profile caused by the at least one neighbor BS, means for receiving at least one of data information or control information, and means for decoding the at least one of the data information or the control information based on the interference power profile.

Any of the UEs above, wherein means for receiving the information comprises means for receiving the information from a serving BS or the at least one neighbor BS.

Any of the UEs above, further comprising means for transmitting a capability report indicating an ability of the UE to estimate or predict the interference power profile, and wherein means for receiving the information comprises means for receiving the information in response to transmitting the capability report.

Any of the UEs above, wherein means for receiving the information comprises means for receiving the information via a radio resource control (RRC) signal, a medium access control (MAC) control element (CE), or downlink control information.

Any of the UEs above, further comprising means for transmitting, prior to receiving the information, a request for the information, and wherein means for receiving the information comprises means for receiving the information in response to transmitting the request.

Any of the UEs above, wherein means for estimating or predicting the interference power profile comprises means for estimating or predicting using a machine learning scheme.

Some aspects of the present disclosure include non-transitory computer readable media having instructions stored therein that, when executed by one or more processors of a user equipment (UE), cause the one or more processors to receive interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS), estimate or predict, based on the interference information received, an interference power profile caused by the at least one neighbor BS, receive at least one of data information or control information, and decode the at least one of the data information or the control information based on the interference power profile.

Any of the non-transitory computer readable media above, wherein the instructions for receiving the information comprises instructions for receiving the information from a serving BS or the at least one neighbor BS.

Any of the non-transitory computer readable media above, further comprising instructions, when executed by the one or more processors, cause the one or more processors to transmit a capability report indicating an ability of the UE to estimate or predict the interference power profile, and wherein receiving the information comprises receiving the information in response to transmitting the capability report.

Any of the non-transitory computer readable media above, wherein the instructions for receiving the information comprises instructions for receiving the information via a radio resource control (RRC) signal, a medium access control (MAC) control element (CE), or downlink control information.

Any of the non-transitory computer readable media above, further comprising instructions, when executed by the one or more processors, cause the one or more processors to transmit, prior to receiving the information, a request for the information, and wherein receiving the information comprises receiving the information in response to transmitting the request.

Any of the non-transitory computer readable media above, wherein the instructions for estimating or predicting comprises instructions for estimating or predicting using a machine learning scheme.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 NEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE) in a network, comprising:
   receiving interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS);
   estimating or predicting, based on the interference information received, an interference power profile caused by the at least one neighbor BS;
   receiving at least one of data information or control information; and
   decoding the at least one of the data information or the control information based on the interference power profile.

2. The method of claim 1, wherein receiving the interference information comprises:
   receiving the interference information from a serving BS or the at least one neighbor BS.

3. The method of claim 1, further comprising, prior to receiving the interference information:
   transmitting a capability report indicating an ability of the UE to estimate or predict the interference power profile; and
   wherein receiving the interference information comprises receiving the interference information in response to transmitting the capability report.

4. The method of claim 1, wherein receiving the interference information comprises:
   receiving the interference information via a radio resource control (RRC) signal, a medium access control (MAC) control element (CE), or downlink control information.

5. The method of claim 1, further comprising:
   transmitting, prior to receiving the interference information, a request for the interference information; and
   wherein receiving the interference information comprises receiving the interference information in response to transmitting the request.

6. The method of claim 1, wherein estimating or predicting the interference power profile comprises:
   estimating or predicting using a machine learning scheme.

7. A user equipment (UE), comprising:
   a memory comprising instructions;
   a transceiver; and
   one or more processors operatively coupled with the memory and the transceiver, the one or more processors configured to execute instructions in the memory to:
      receive interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS);
estimate or predict, based on the interference information received, an interference power profile caused by the at least one neighbor BS;
receive at least one of data information or control information; and
decode the at least one of the data information or the control information based on the interference power profile.

8. The UE of claim 7, wherein receiving the interference information comprises:
receiving the interference information from a serving BS or the at least one neighbor BS.

9. The UE of claim 7, wherein the one or more processors are further configured to:
transmit a capability report indicating an ability of the UE to estimate or predict the interference power profile; and
wherein receiving the interference information comprises receiving the interference information in response to transmitting the capability report.

10. The UE of claim 7, wherein receiving the interference information comprises:
receiving the interference information via a radio resource control (RRC) signal, a medium access control (MAC) control element (CE), or downlink control information.

11. The UE of claim 7, wherein the one or more processors are further configured to:
transmit, prior to receiving the interference information, a request for the interference information; and
wherein receiving the interference information comprises receiving the interference information in response to transmitting the request.

12. The UE of claim 7, wherein estimating or predicting the interference power profile comprises:
estimating or predicting using a machine learning scheme.

13. A non-transitory computer readable medium having instructions stored therein that, when executed by one or more processors of a user equipment (UE), cause the one or more processors to:
receive interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS);
estimate or predict, based on the interference information received, an interference power profile caused by the at least one neighbor BS;
receive at least one of data information or control information; and
decode the at least one of the data information or the control information based on the interference power profile.

14. The non-transitory computer readable medium of claim 13, wherein the instructions for receiving the interference information comprises instructions for:
receiving the interference information from a serving BS or the at least one neighbor BS.

15. The non-transitory computer readable medium of claim 13, further comprising instructions, when executed by the one or more processors, cause the one or more processors to:
transmit a capability report indicating an ability of the UE to estimate or predict the interference power profile; and
wherein receiving the interference information comprises receiving the interference information in response to transmitting the capability report.

16. The non-transitory computer readable medium of claim 13, wherein the instructions for receiving the interference information comprises instructions for:
receiving the interference information via a radio resource control (RRC) signal, a medium access control (MAC) control element (CE), or downlink control information.

17. The non-transitory computer readable medium of claim 13, further comprising instructions, when executed by the one or more processors, cause the one or more processors to:
transmit, prior to receiving the interference information, a request for the interference information; and
wherein receiving the interference information comprises receiving the interference information in response to transmitting the request.

18. The non-transitory computer readable medium of claim 13, wherein the instructions for estimating or predicting comprises instructions for:
estimating or predicting using a machine learning scheme.

19. A user equipment (UE), comprising:
means for receiving interference information relating to at least one of a scheduling granularity, a subcarrier spacing, a scheduler type, resource utilization, a number of active UEs, a number of active beams, an elevation and an azimuth angle of each of the number of active beams, a synchronization signal block index, or a semi-persistent scheduling configuration associated with at least one neighbor base station (BS);
means for estimating or predicting, based on the interference information received, an interference power profile caused by the at least one neighbor BS;
means for receiving at least one of data information or control information; and
means for decoding the at least one of the data information or the control information based on the interference power profile.

20. The UE of claim 19, wherein means for receiving the interference information comprises:
means for receiving the interference information from a serving BS or the at least one neighbor BS.

21. The UE of claim 19, further comprising:
means for transmitting a capability report indicating an ability of the UE to estimate or predict the interference power profile; and
wherein receiving the interference information comprises receiving the interference information in response to transmitting the capability report.

22. The UE of claim 19, wherein means for receiving the interference information comprises:
means for receiving the interference information via a radio resource control (RRC) signal, a medium access control (MAC) control element (CE), or downlink control information.

23. The UE of claim 19, further comprising:
means for transmitting, prior to receiving the interference information, a request for the interference information; and wherein receiving the interference information comprises receiving the interference information in response to transmitting the request.

24. The UE of claim 19, wherein means for estimating or predicting the interference power profile comprises:

means for estimating or predicting using a machine learning scheme.

\* \* \* \* \*